(12) United States Patent
Sonzala et al.

(10) Patent No.: US 8,919,401 B2
(45) Date of Patent: *Dec. 30, 2014

(54) WHEEL END ASSEMBLY HIGH-TEMPERATURE WARNING SYSTEM

(75) Inventors: Frank Joseph Sonzala, San Antonio, TX (US); Mark Kevin Hennig, Corpus Christi, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/435,924

(22) Filed: Mar. 30, 2012

(65) Prior Publication Data

US 2012/0212039 A1 Aug. 23, 2012

Related U.S. Application Data

(60) Division of application No. 12/166,123, filed on Jul. 1, 2008, now Pat. No. 8,186,403, which is a continuation of application No. 11/039,551, filed on Jan. 20, 2005, now Pat. No. 7,416,005, which is a continuation of application No. 10/657,886, filed on Sep. 9, 2003, now Pat. No. 6,892,778.

(51) Int. Cl.
| | |
|---|---|
| *B60C 23/10* | (2006.01) |
| *B61K 9/04* | (2006.01) |
| *B60C 23/00* | (2006.01) |
| *B60C 23/20* | (2006.01) |

(52) U.S. Cl.
CPC ............... *B60C 23/003* (2013.01); *B61K 9/04* (2013.01); *B60C 23/20* (2013.01)

USPC .......................................... 152/417; 152/415

(58) Field of Classification Search
USPC ........................... 152/415–417; 340/442, 449
See application file for complete search history.

(56) References Cited

U.S. PATENT DOCUMENTS

| | | | |
|---|---|---|---|
| 2,693,841 A * | 11/1954 | Webster, Jr. .................. 152/417 |
| 3,645,479 A | 2/1972 | Kostroun et al. |
| 3,889,077 A | 6/1975 | Hayashi |
| 3,898,638 A | 8/1975 | Deane et al. |
| 4,004,271 A | 1/1977 | Haven et al. |
| 4,058,185 A | 11/1977 | Ploeger |
| 4,333,004 A | 6/1982 | Forgue et al. |
| 4,700,763 A | 10/1987 | Williams |
| 4,812,826 A | 3/1989 | Kaufman et al. |
| 4,947,786 A | 8/1990 | Maynard et al. |
| 5,287,906 A | 2/1994 | Stech |
| 5,377,736 A | 1/1995 | Stech |
| 5,381,090 A | 1/1995 | Adler et al. |
| 5,413,159 A | 5/1995 | Olney et al. |
| 5,429,167 A * | 7/1995 | Jensen .......................... 152/417 |
| 5,492,393 A | 2/1996 | Peisker et al. |
| 5,538,062 A | 7/1996 | Stech |
| 5,540,268 A | 7/1996 | Mittal |

(Continued)

*Primary Examiner* — Jason Bellinger
(74) *Attorney, Agent, or Firm* — Cox Smith Matthews Incorporated; Derrick A. Pizarro

(57) ABSTRACT

The present invention is directed to a wheel end assembly having a high temperature warning system for giving a warning in the event that the temperature in the assembly reaches a predetermined value such as caused by hub bearing failure or a brake related failure. In one embodiment the system may be a stand-alone system for installation on any vehicle such as a trailer. In another embodiment the system may be combined with an automatic tire inflation system.

16 Claims, 16 Drawing Sheets

(56) References Cited

U.S. PATENT DOCUMENTS

| | | | | |
|---|---|---|---|---|
| 5,553,647 A | | 9/1996 | Jaksic | |
| 5,565,065 A | * | 10/1996 | Wang | 202/176 |
| 5,584,773 A | * | 12/1996 | Kershaw et al. | 475/160 |
| 5,584,949 A | * | 12/1996 | Ingram | 152/417 |
| 5,587,698 A | | 12/1996 | Genna | |
| 5,767,398 A | | 6/1998 | Naedler | |
| 6,105,645 A | | 8/2000 | Ingram | |
| 6,145,559 A | * | 11/2000 | Ingram, II | 152/417 |
| 6,401,743 B1 | | 6/2002 | Naedler | |
| 6,435,238 B1 | | 8/2002 | Hennig | |
| 6,546,892 B2 | | 4/2003 | Kelly, Jr. et al. | |
| 6,670,890 B2 | | 12/2003 | Kyrtsos et al. | |
| 6,698,482 B2 | | 3/2004 | Hennig et al. | |
| 6,759,963 B2 | | 7/2004 | Hayes | |
| 6,892,778 B2 | | 5/2005 | Hennig et al. | |
| 7,416,005 B2 | | 8/2008 | Hennig et al. | |
| 8,186,403 B2 | * | 5/2012 | Sonzala et al. | 152/417 |
| 2005/0156463 A1 | | 7/2005 | Hennig et al. | |
| 2005/0194079 A1 | | 9/2005 | Hennig | |

* cited by examiner

WHEEL END ASSEMBLY HIGH-TEMPERATURE WARNING SYSTEM

BACKGROUND OF THE PRESENT INVENTION

This application is a divisional of U.S. patent application Ser. No. 12/166,123 filed Jul. 1, 2008, which issued as U.S. Pat. No. 8,186,403 on May 29, 2012, which is a continuation of U.S. patent application Ser. No. 11/039,551 filed Jan. 20, 2005, which issued as U.S. Pat. No. 7,416,005, which is a continuation of U.S. patent application Ser. No. 10/657,886, filed Sep. 9, 2003, which issued as U.S. Pat. No. 6,892,778, the disclosures of which are incorporated herein by reference. The present invention is directed to a wheel end assembly having a high temperature warning system for giving a warning in the event that the temperature in the assembly reaches a predetermined value such as by a hub-bearing failure or brake related failure. The system may be a stand-alone system for installation on any vehicle such as a tractor trailer or in another embodiment may be a system combined with an automatic tire inflation system.

In the event of a wheel end assembly bearing failure or brake related failure on a vehicle such as a tractor trailer, the temperature in the assembly and axle spindle area can reach a temperature to where the tires or lubricant may ignite causing the vehicle to burn or the wheel to lock up. It is also the possibility, due to the intense heat caused by any failure that the wheel can detach from the axle.

BRIEF SUMMARY OF THE INVENTION

The present invention is directed to a high temperature warning system for a wheel end assembly in which the vehicle has an air pressure supply by providing a heat sensitive control mounted adjacent the wheel assembly for measuring the temperature of the wheel assembly and controlling a normally closed valve connected between the inside and outside of the air pressure supply. A warning system is connected to the pressure supply for actuation on opening of the valve upon a predetermined temperature in the wheel area.

A further object of the present invention is the provision of a wheel end assembly having a high temperature warning system including an air pressure supply, a normally closed valve connected between the inside and outside of the pressure supply, a heat sensitive control connected to and actuating the valve upon a predetermined temperature in which the control is mounted adjacent the wheel assembly for measuring the temperature of the wheel assembly, and a warning system connected to the pressure supply for actuation upon opening of the valve.

A still further object is wherein the heat sensitive control includes a heat sensitive pressure barrier. In one embodiment the heat sensitive pressure barrier is a fusible plug and may include an eutectic alloy.

Still a further object of the present invention is wherein the air pressure supply includes a hollow wheel axle closed at its ends with a plug. In one embodiment the heat sensitive pressure barrier is positioned in each plug. In another embodiment one or more heat sensitive pressure barriers are positioned in the axle adjacent the bearings or brakes in the wheel assembly. In another embodiment, the air pressure supply includes air supply tubing positioned in the wheel axle and connected to one or more heat sensitive pressure barriers. In another embodiment, the heat sensitive pressure barriers are positioned adjacent the wheel bearings and brakes.

And still a further embodiment, the air pressure supply may include an automatic tire inflation system for providing air to a rotating tire on a wheel hub mounted on bearings on a hollow axle connected to the air supply for receiving air, and a rotary connection between the tire and the axle.

Still a further object of the present invention is in which a vehicle having an automatic tire inflation system, is for providing air to a rotating tire on a wheel hub mounted on bearings on a hollow axle, is connected to an air pressure supply for supplying air to the inside of the axle, a rotary connection in communication between the tire and the air inside of the axle, of the combination of a high temperature warning system comprising a normally closed valve connected between the inside and outside of the axle in communication with the air in the axle. A heat sensitive control is connected to and actuating the valve open upon a predetermined temperature and said control is mounted adjacent the wheel assembly for measuring the temperature of the wheel assembly and axle, and a warning system is connected to the air supply for actuation upon opening of the valve. In one embodiment the hollow axle is closed at the ends with a plug and a heat sensitive pressure barrier is positioned in each plug. As an alternative, one or more heat sensitive pressure barriers may be positioned in the axle adjacent the bearings or brakes in the wheel assembly. And in another alternative the air pressure supply includes an air supply tubing positioned in the axle and connected to one or more heat sensitive pressure barriers. Again, the pressure barriers may be positioned in a plug at each end of the hollow axle or positioned adjacent the wheel bearings and brakes are connected in the axle.

The foregoing has outlined rather broadly the features and technical advances of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the invention. It should also be realized to those skilled in the art that such equivalent construction do not depart from the spirit and scope of the invention as set forth in the appended claims. The novel features which are believed to be characteristic of the invention both as to its organization and method of operation, together with further objects and advantages will be better understood from the following descriptions when considered in connection with the accompanying figures. It is to be expressly understood, however, that each of the figures is provided for the purposes of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
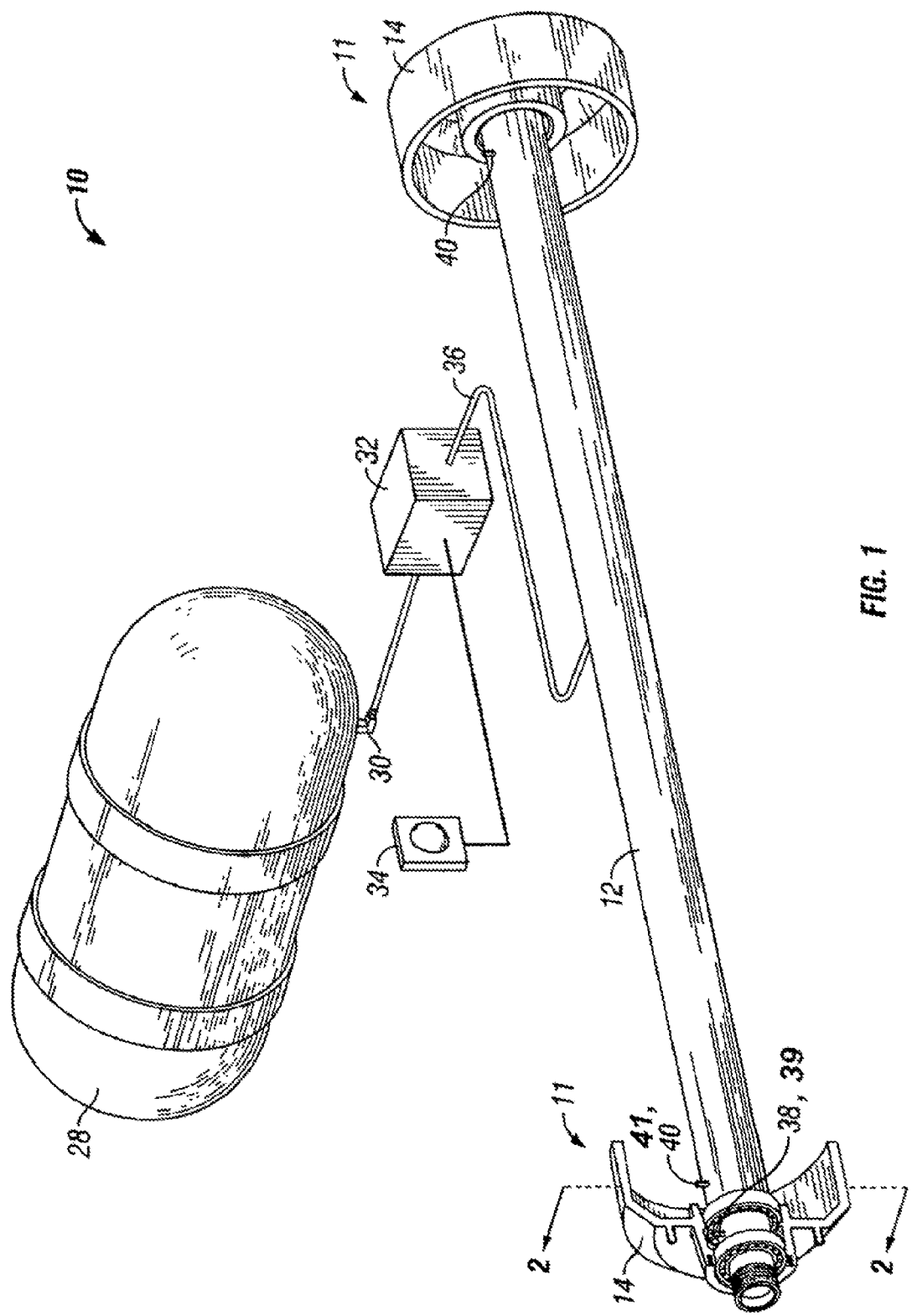
FIG. 1 is a schematic perspective elevational view, partly in cross section, illustrating one form of an axle of a vehicle having a high temperature warning system connected to the wheel assemblies.
Figure 2:
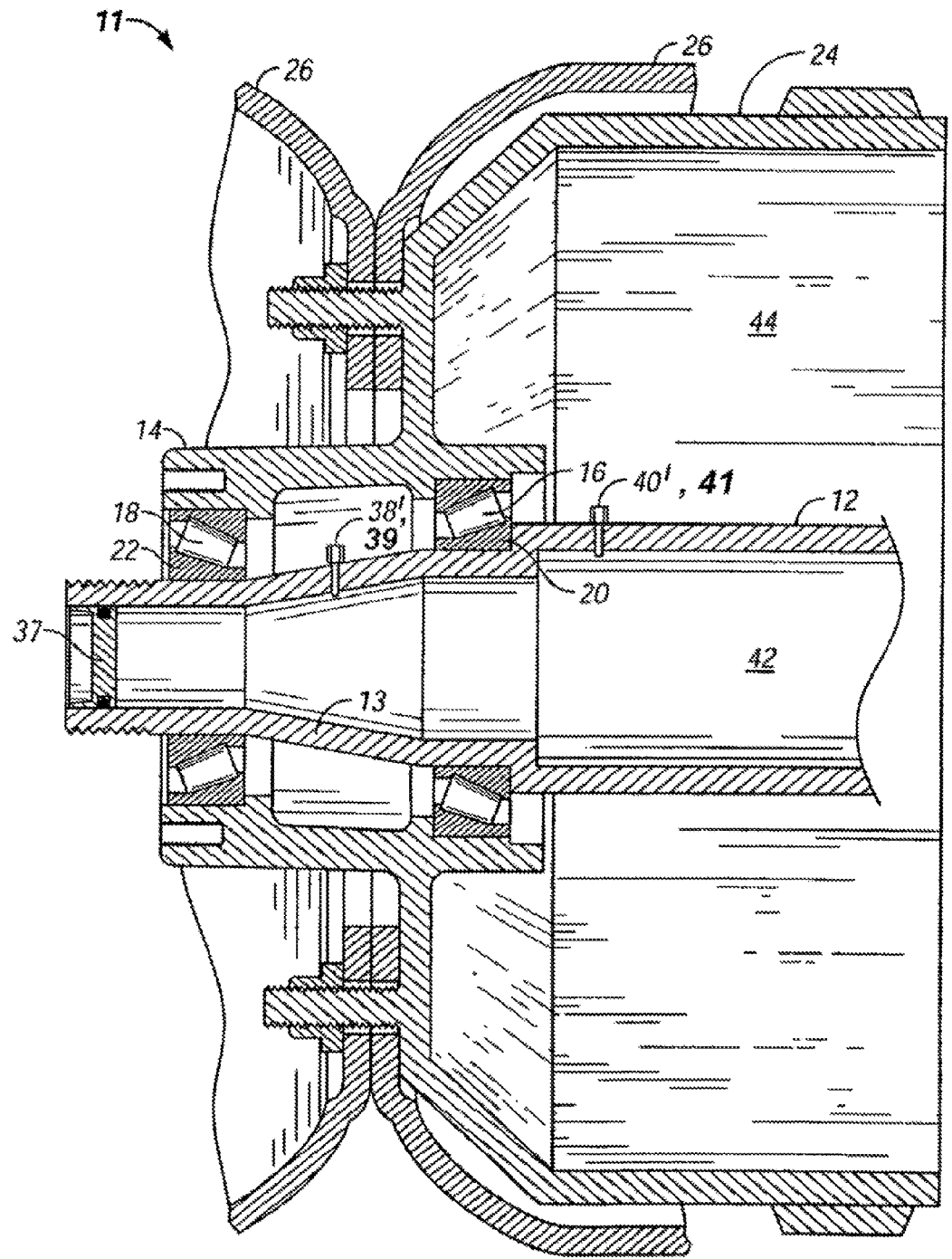
FIG. 2 is an enlarged elevational view, in cross section, taken along the line 2-2 of FIG. 1 illustrating a wheel assembly and a high temperature warning system.

Referring now to FIGS. 1 and 2, the reference numeral 10 generally indicates the high temperature warning system of the present invention as installed in a vehicle having an axle 12 and a spindle 13 portion thereof. A wheel assembly 11 includes a hub 14 which rotates on inner and outer bearings 16 and 18, respectively, which rotate on inner and outer bearing races, respectively, 20 and 22, and extends through a brake drum 24 and supports a tire and wheel 26. As has been indicated in the event of a bearing 16 or 18 or a brake 24 failure, the temperature in the bearings 16 and 18, the brake drum 24 and spindle 13 area may reach a temperature to where the tires (not shown) on the tire and wheel 26 or lubricant (not shown) may ignite causing a fire. There is also the possibility because of the intense heat caused by such failures that the hub 14 and wheel and tire 26 may detach from the axle 12.

The temperature warning system 10 of the present invention includes an air pressure supply 28 which is a normal component on a truck or vehicle for various purposes such as brakes, a pressure protection valve 30, a flow switch 32 and an indicator or warning system light 34. The air pressure supply preferably includes the axle 12 which is hollow and is connected to supply 28 through line 36 and includes an internal plug 37 at each end of the axle 12 whereby the interior of the axle 12 forms part of the air pressure supply.

One or more normally closed valves 38 and 40, (FIG. 1) such as heat sensitive pressure barriers 38' and 40' (FIG. 2) comprising a fusible plug 38' and 40' (FIG. 4), are connected between the inside 42 and outside 44 of the pressure supply. The heat sensitive pressure barriers 38' and 40' are fusible plugs 38" and 40" which also form a heat sensitive control for actuating the opening and closing of the valves 38 and 40 upon a predetermined temperature. Thus, when the area in which the plugs 38" and 40" are installed reaches a certain temperature the alloy will melt, creating an air leak from the air supply tank 28. This will be detected by the flow switch 32 which actuates the warning system light 34 which is positioned adjacent the driver of the vehicle to indicate a problem. The heat sensitive pressure barriers 38' and 40' are mounted adjacent to the wheel assemblies 11 for measuring the temperature of the wheel assembly 11. In the embodiment shown in FIG. 2 the pressure barriers 38' and 40' extend radially outwardly from the axel 12 and spindle 13 and are positioned adjacent the bearings 20, 22 and brake drum 24. While any type of fusible plug is satisfactory, one sold under the trademark LEEKPRUF sold by Mueller Refrigeration Company, Inc. is satisfactory. Or course, other types of thermally operated valves (variously denoted by reference numbers 39, 39', 39", 39a, 39b, 39c, 39d, 39e and 39f, and 41, 41', 41", 41e and 41f in FIGS. 10-18; all other reference numbers in FIGS. 10-18 denote the same elements as described in connection with FIGS. 1-9) may be used for opening the air supply such as a thermally electric switch which operates an electric operated valve. While it is convenient to use the hollow axle 12 as part of the air supply, other types of air supply tubing could be provided.

Figure 3:
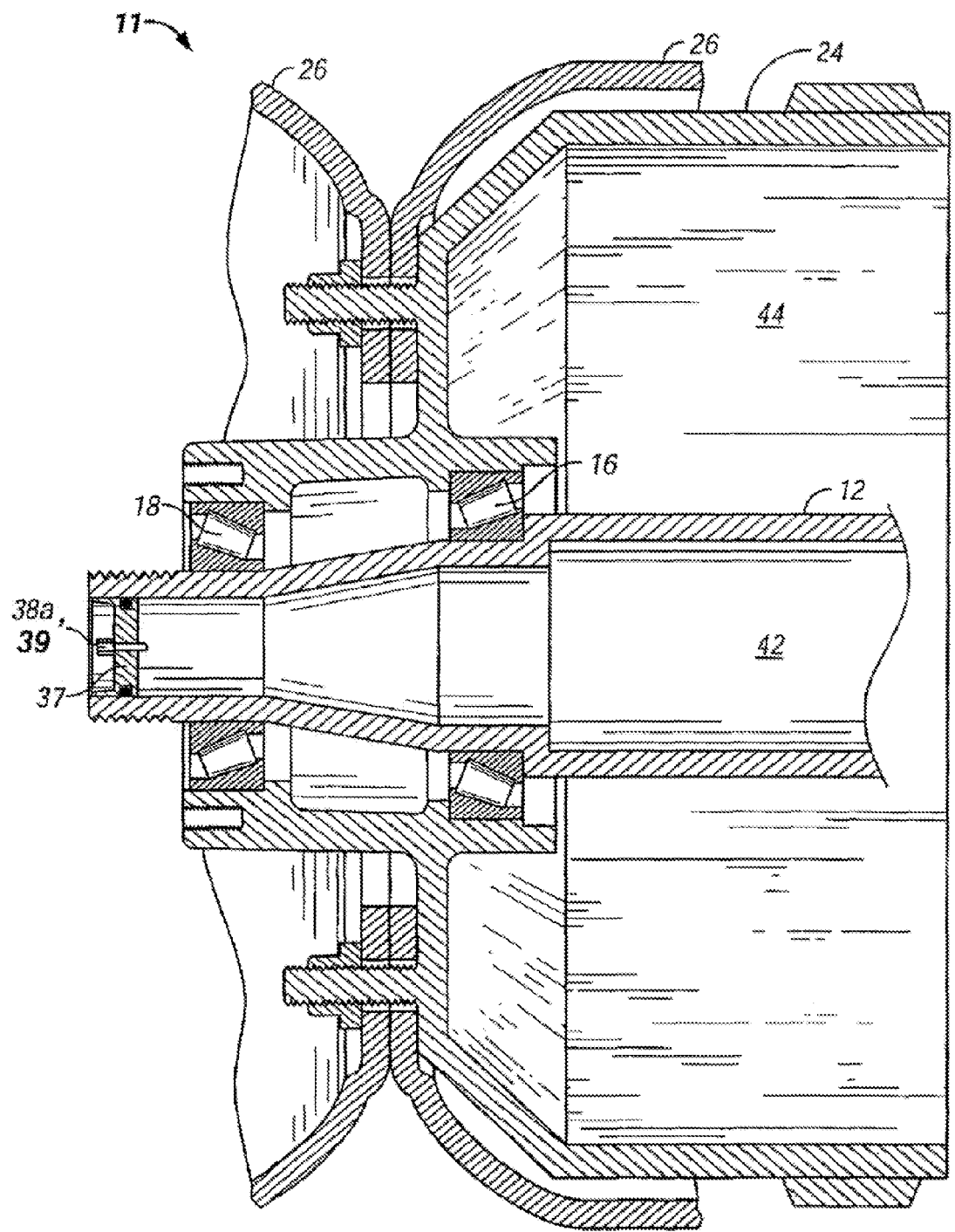
FIG. 3 is a view similar to FIG. 2 illustrating another form of the present invention.

Referring now to FIG. 3, another form of the present invention is shown which is similar to FIG. 2 with the exception that a heat sensitive pressure barrier or fusible plug 38a is positioned in the end plug 37. This provides a simplified manufacturing and construction form, but yet the heat sensitive pressure barrier and control is mounted sufficiently close to the heat assembly 13 for measuring the temperature of the wheel hub assemblies 11.

Figure 4:
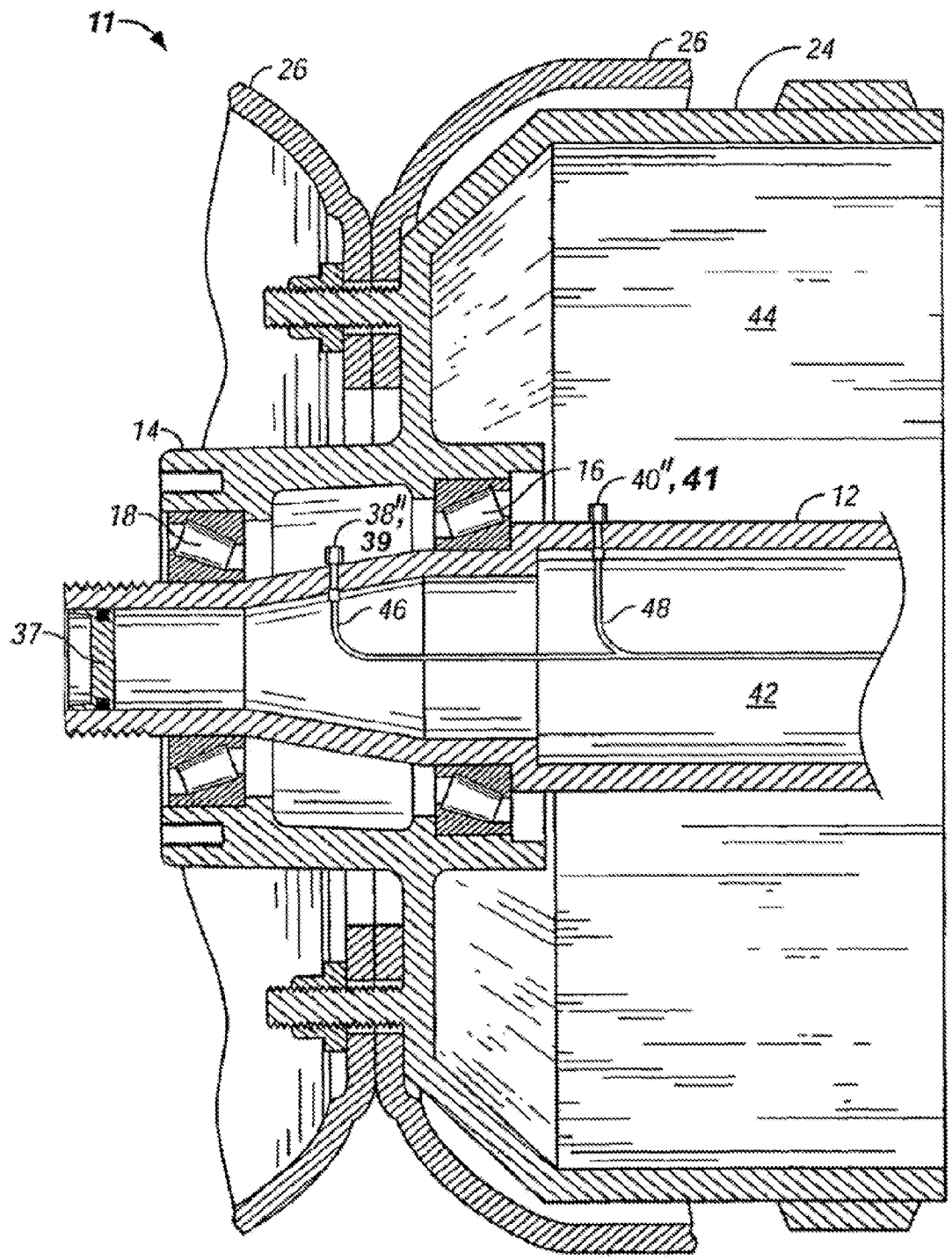
FIG. 4 is a view similar to FIG. 2 illustrating still another embodiment of the present invention.

Referring now to FIG. 4, still another form of the present invention is shown in which instead of the interior 42 of the axle 12 forming a part of the air pressure system includes air supply conduits or tubings 46 and 48 connected between the air line 36 (FIG. 1) and the fusible plugs 38 and 40, respectively.

Figure 5:
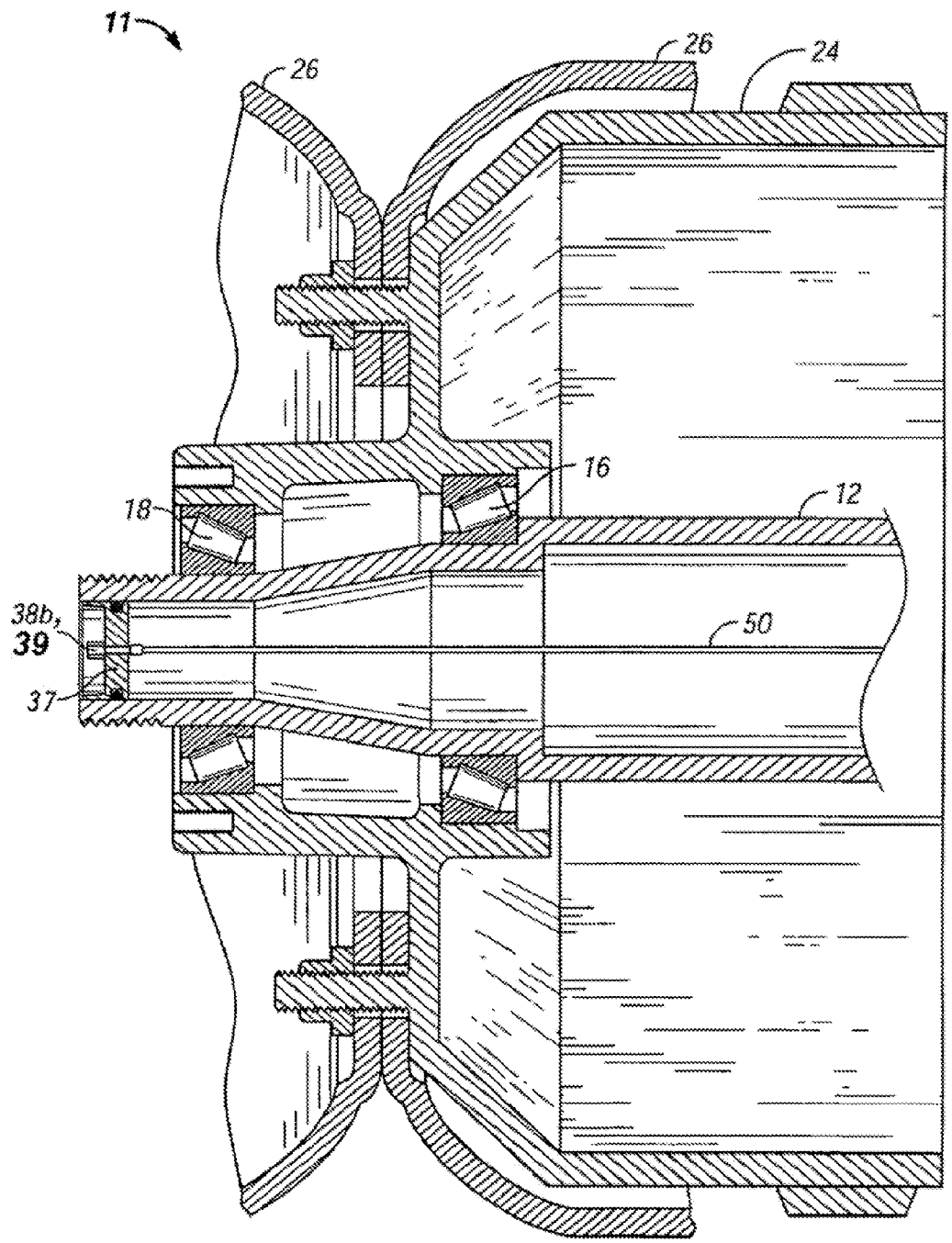
FIG. 5 is a view similar to FIG. 2 illustrating still another form of the present invention.

Referring now to FIG. 5, another form is shown in which again the axle 12 does not form an air supply but an air conduit or tubing 50 is connected between the air line 36 (FIG. 1) and a fusible plug 38b in the end plug 37. The end plugs 37 in the embodiments of FIGS. 4 and 5 serve the purpose of preventing debris in the inside of the axle 12.

While the warning system of FIGS. 1-5 provides a stand-alone system for vehicles such as trailer tractors, the warning system is particularly and easily adapted for use with an automatic tire inflation system which already includes an air pressure supply and a warning system measuring the loss of air pressure from the system or tires. Therefore, the combination of the temperature warning system of the present invention with an automatic tire inflation system provides a means of informing the vehicle operator of temperature problems. While the present invention can be used with various types of automatic tire inflation systems, it is useful with the system shown in FIG. 6 and more fully described and illustrated in patent application Ser. No. 10/186,951, which issued as U.S. Pat. No. 6,698,482 on Mar. 2, 2004, entitled "Rotary Air Connection With Bearing For Tire Inflation System" which is hereby incorporated by reference. The reference numeral 100 generally indicates the rotary air connection for supplying air from an air supply on a vehicle in an automatic tire inflation system for a vehicle to the rotating tires. The numeral 112 generally indicates one axle or spindle. A hub cap 114 is provided at each end of the axle 112 for retaining lubricant in the wheel bearings and an air supply 116, either directly in the axle 112, or through an interior conduit (not shown) in the inside of the axle 112 supplies air to the rotary air connection through the inside of the axle. A pneumatic rotary union generally indicated by the reference 120 is supported and positioned in the center end of the axle 120, such as by force fit plug 220, but sealingly engages the interior of the axle 112 by a seal 124 if air is injected directly into the inside of the axle 112. The rotary union 120 has a first stationary part 128 having a passageway 136 therethrough. The passageway 136 is in communication with the air supply 116. A first resilient rotary seal 138 is supported in the passageway 136 and encircles the passageway 136. The union 120 includes a second rotatable part including a tubular member 142 having a first end 144 and a second end 146. The second end 146 is coaxially extendable through and is longitudinally and rotationally movable in the passageway 136 and sealably engages the rotary seal 138 and is in communication with the air supply 116. The first end 144 of the tubular member 142 is sealably connected to the air connection or T-body 152 on the hub cap 144 through a seal 150. An air connection 152 or T-body is provided on the hub cap 144 for connection to the tire or tires at the end of the axle 112. The end 144 of the tubular member 142 includes a shoulder which includes a bearing 101. In operation, air 116 is supplied through the stationary part 128 of the rotary union 120. The hub cap 114 rotates with the wheels relative to the tubular member 142. The above-named description is generally disclosed in U.S. Pat. No. 6,698,482, entitled "Rotary Air Connection With Bearing For Tire Inflation System".

Figure 6:
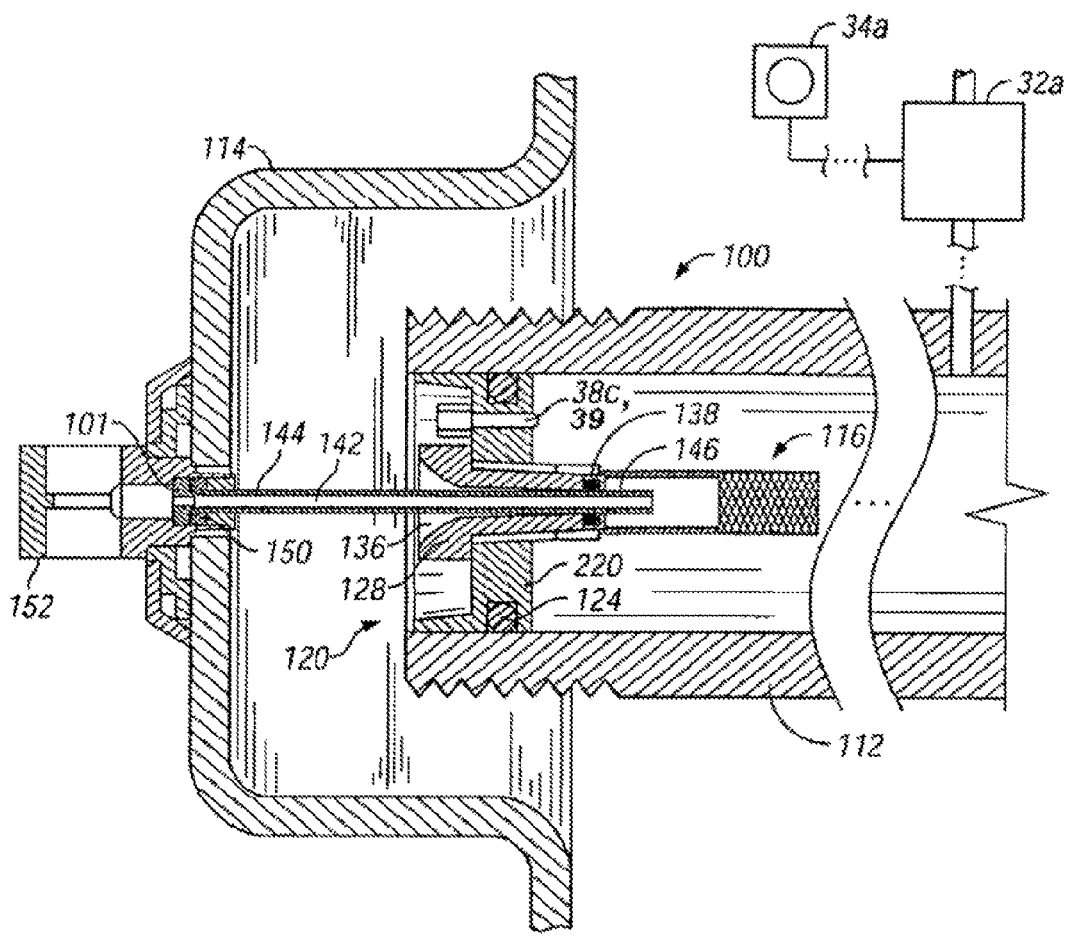
FIG. 6 is an elevational cross-sectional view of a portion of an automatic tire inflation system connected to an axle and providing a high temperature warning system.

Thus, the automatic tire inflation system 100 of FIG. 6 already includes an air pressure supply 116 and any suitable warning system consisting of a flow switch 32a and a warning indicator light 34a. The use of a heat sensitive pressure barrier 38c at a location near the wheel bearings or brake area on the spindle 113 provides a temperature warning system of the present invention. Again, if the spindle reaches a predetermined temperature the fusible plug melts releasing air from the air supply 116 and actuates the warning system light 34a for notification of the operator. The operator can quickly determine whether the warning system 34a is indicating a pressure leak in the tires or a high temperature problem in the wheel hub area.

Figure 7:
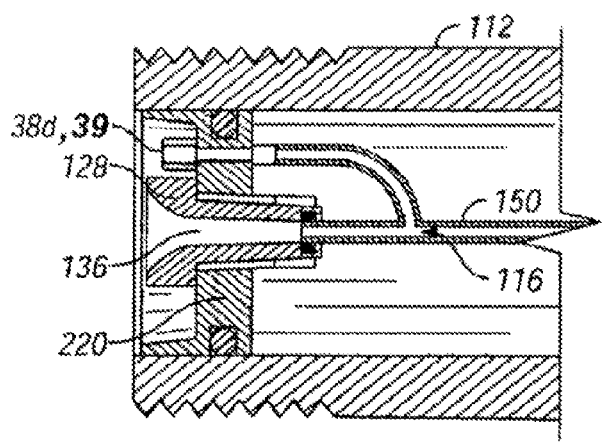
FIG. 7 is an elevational view, in cross section, illustrating a partial of an automatic tire inflation system with other forms of high temperature warning systems.

Referring now to FIG. 7, another form of the present invention is shown having an automatic tire inflation system of which only stationary part 128 of the rotary connection is shown. In this form of the invention the air supply 116 is supplied through an internal conduit or tubing 150 which supplies air to the passageway 136 in the member 128 and also supplies air to a heat sensitive pressure barrier or fusible plug 38d.

Figure 8:
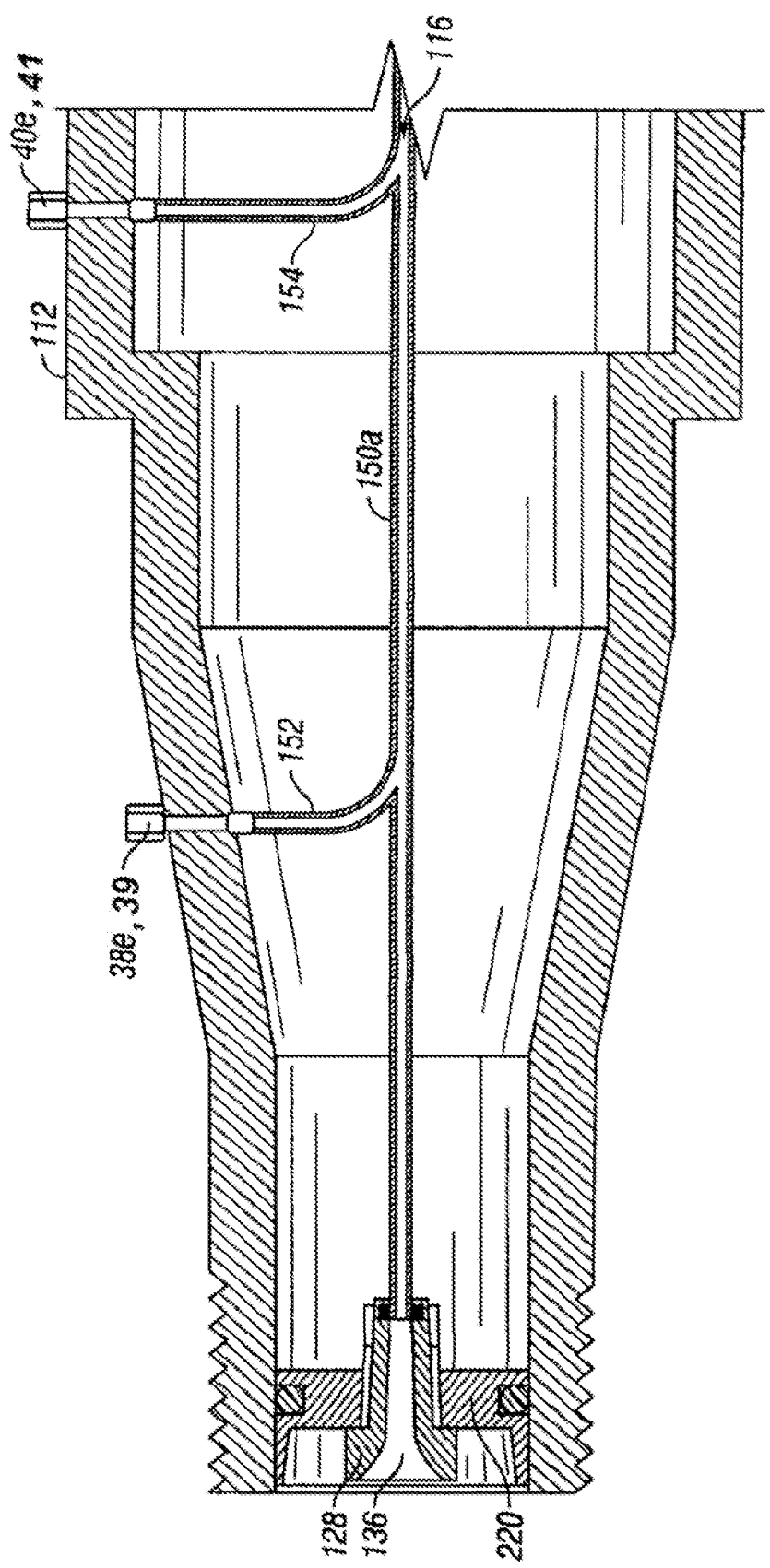
FIG. 8 is an elevational view in cross section of a part of an automatic tire inflation system showing another form of a temperature warning system.
Figure 9:
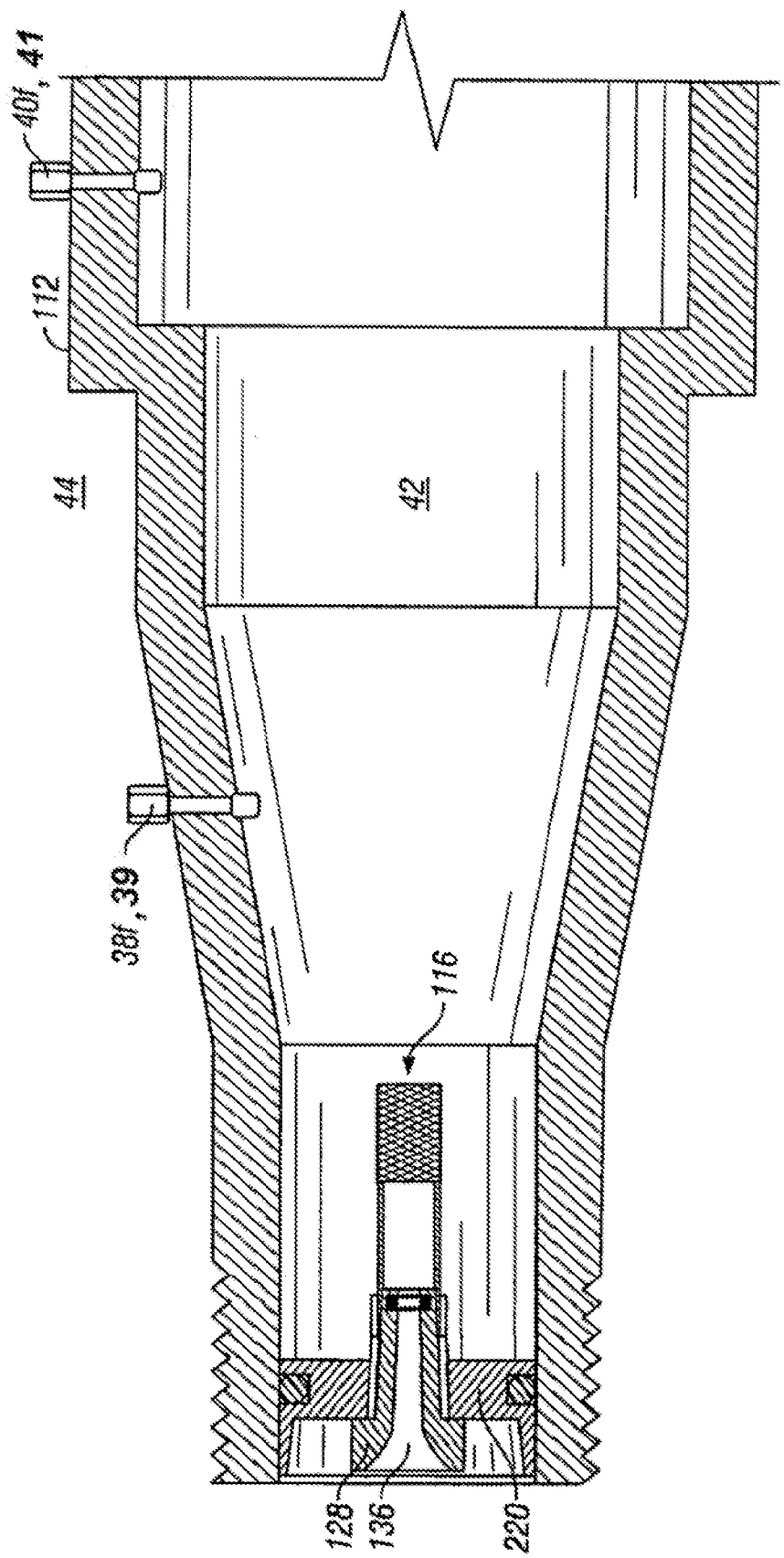
FIG. 9 is an elevational view, in cross section, showing a part of another automatic tire inflation system having another form of a high temperature warning system.
Figure 10:
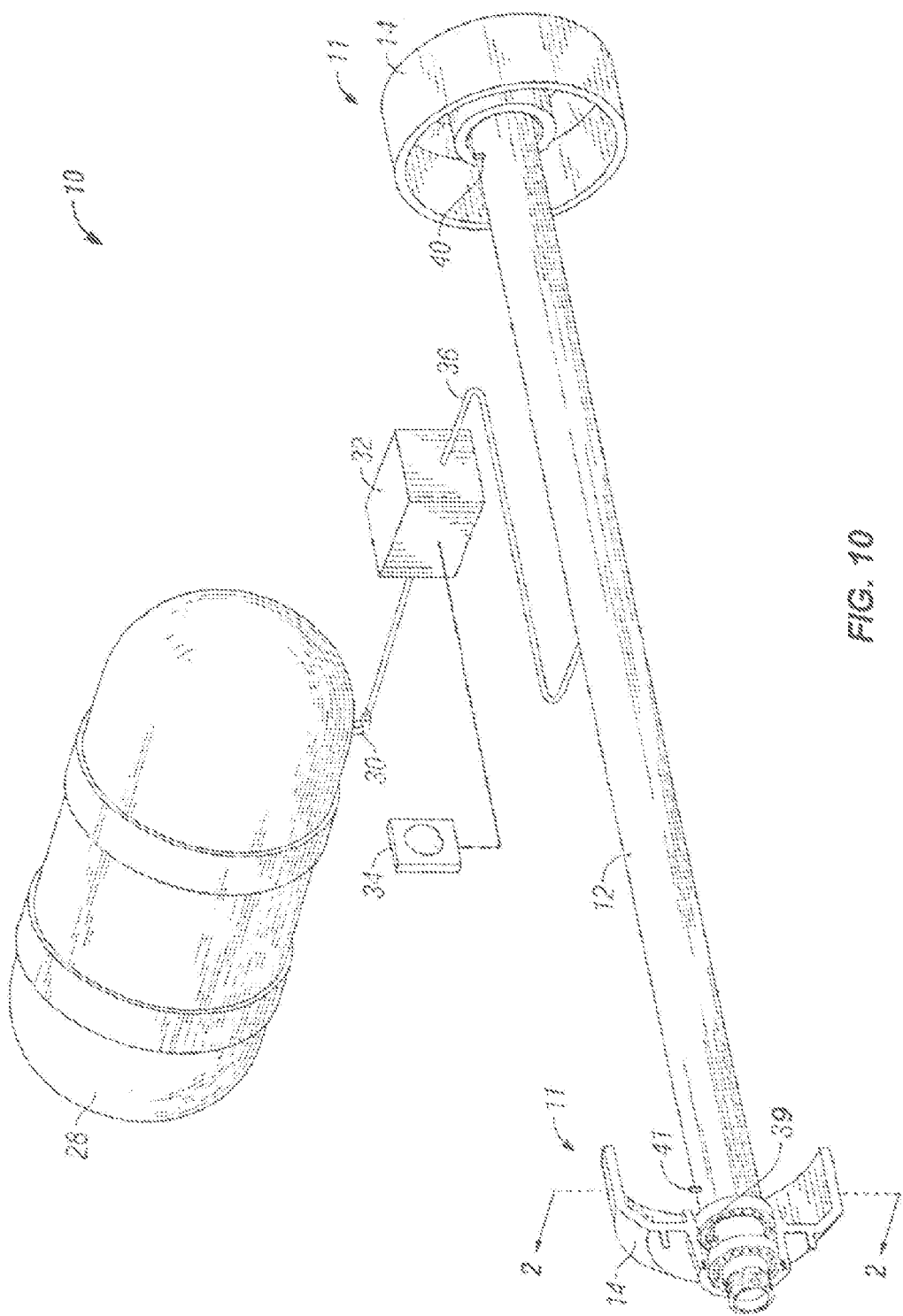
FIG. 10 is a schematic perspective elevational view, partly in cross section, illustrating an embodiment of an axle of a vehicle having a high-temperature warning system.
Figure 11:
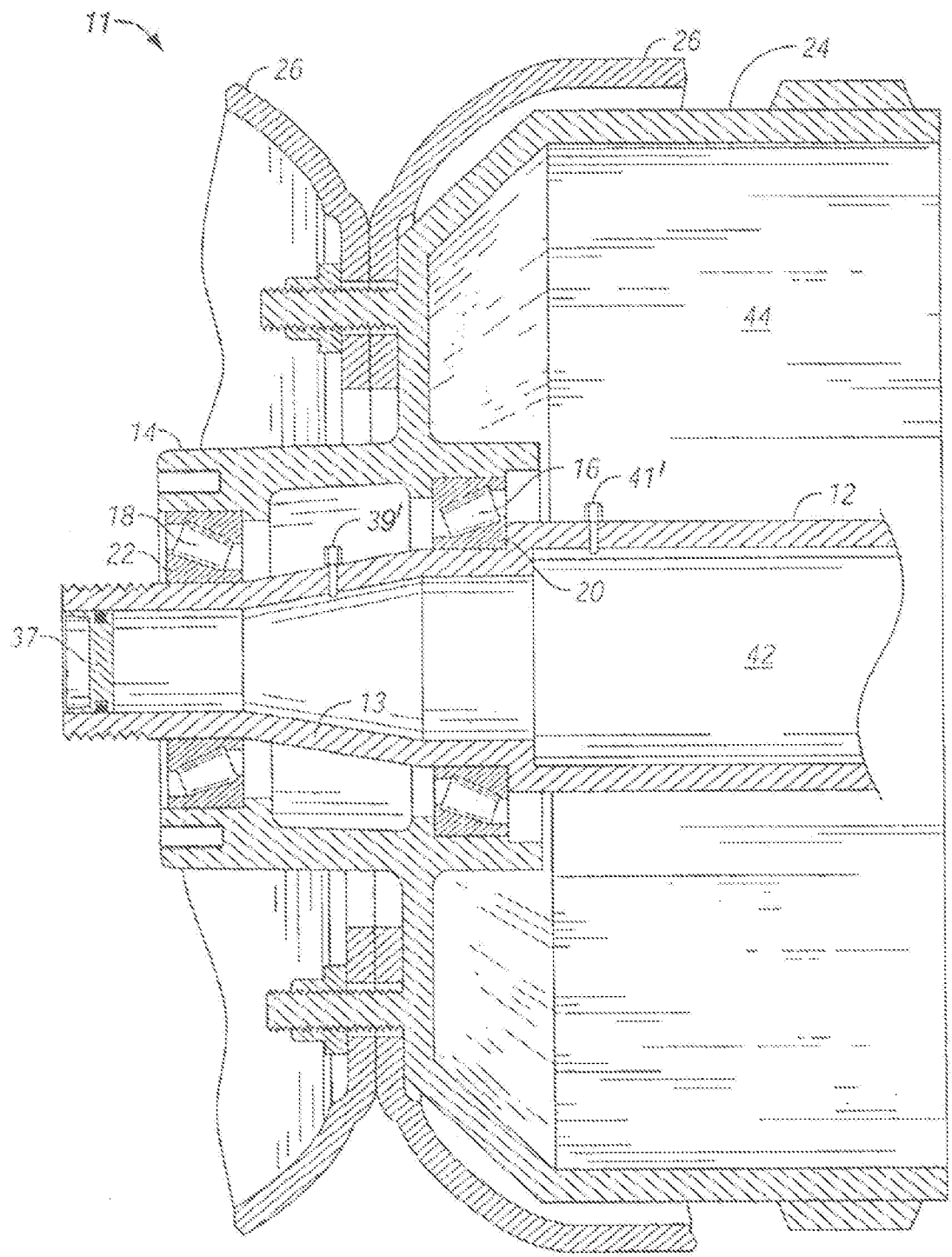
FIG. 11 is an enlarged elevational view, in cross section, taken along the line 2-2 of FIG. 11 illustrating a wheel-end assembly and a high-temperature warning system.
Figure 12:
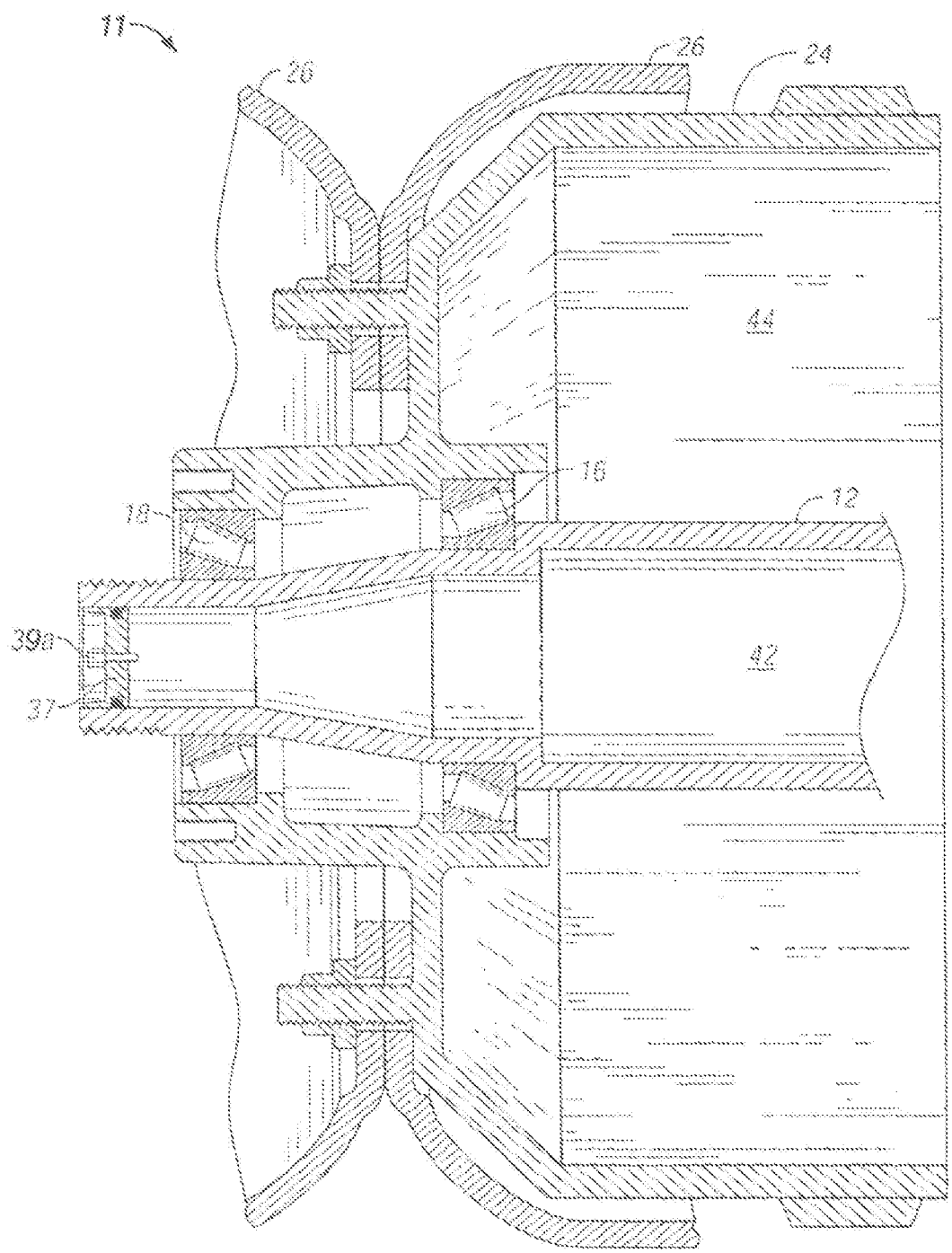
FIG. 12 is a view similar to FIG. 11 illustrating another embodiment of a wheel-end assembly high-temperature warning system.
Figure 13:
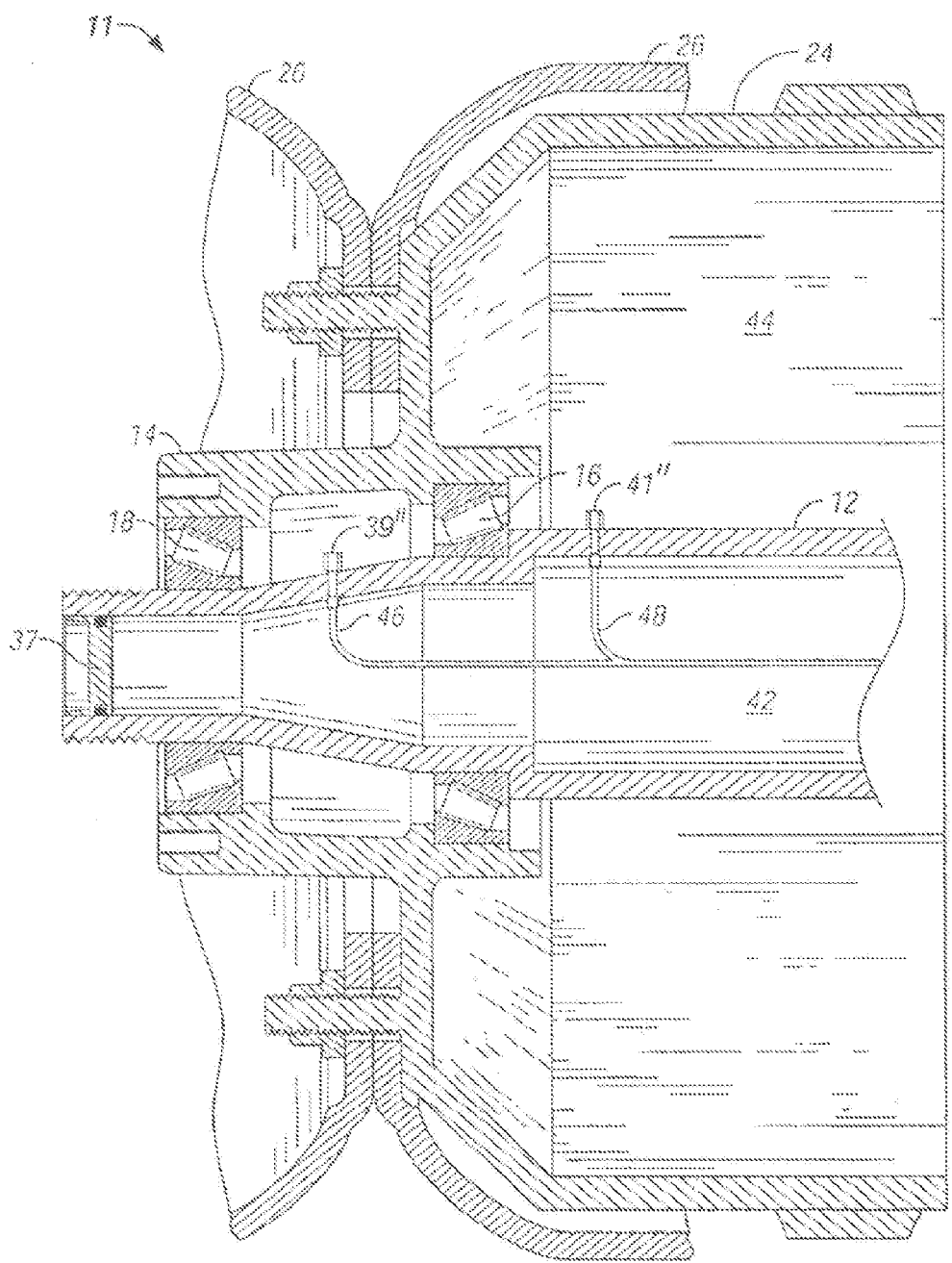
FIG. 13 is a view similar to FIG. 11 illustrating still another embodiment of a wheel-end assembly high-temperature warning system.
Figure 14:
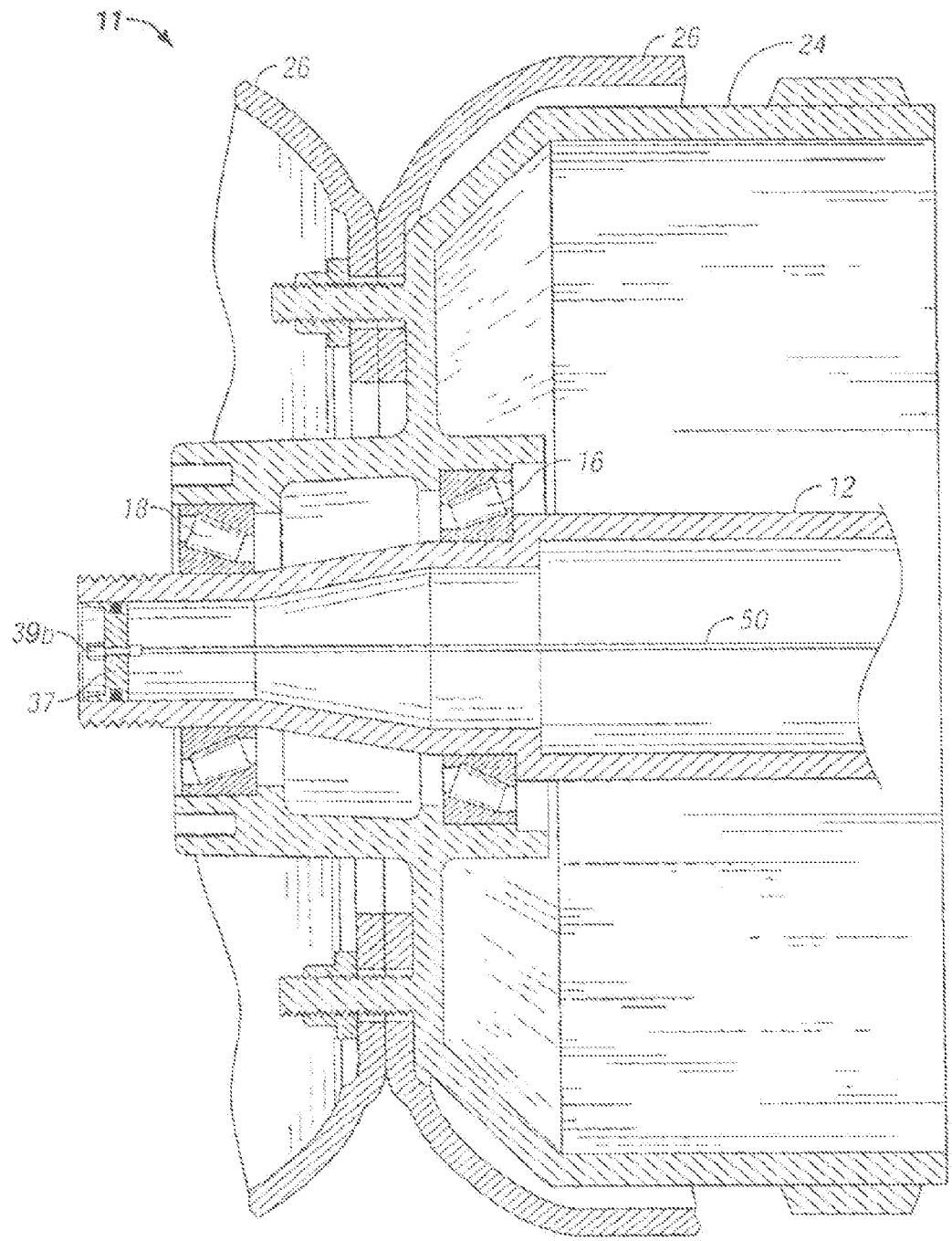
FIG. 14 is a view similar to FIG. 11 illustrating another embodiment of a wheel-end assembly high-temperature warning system.
Figure 15:
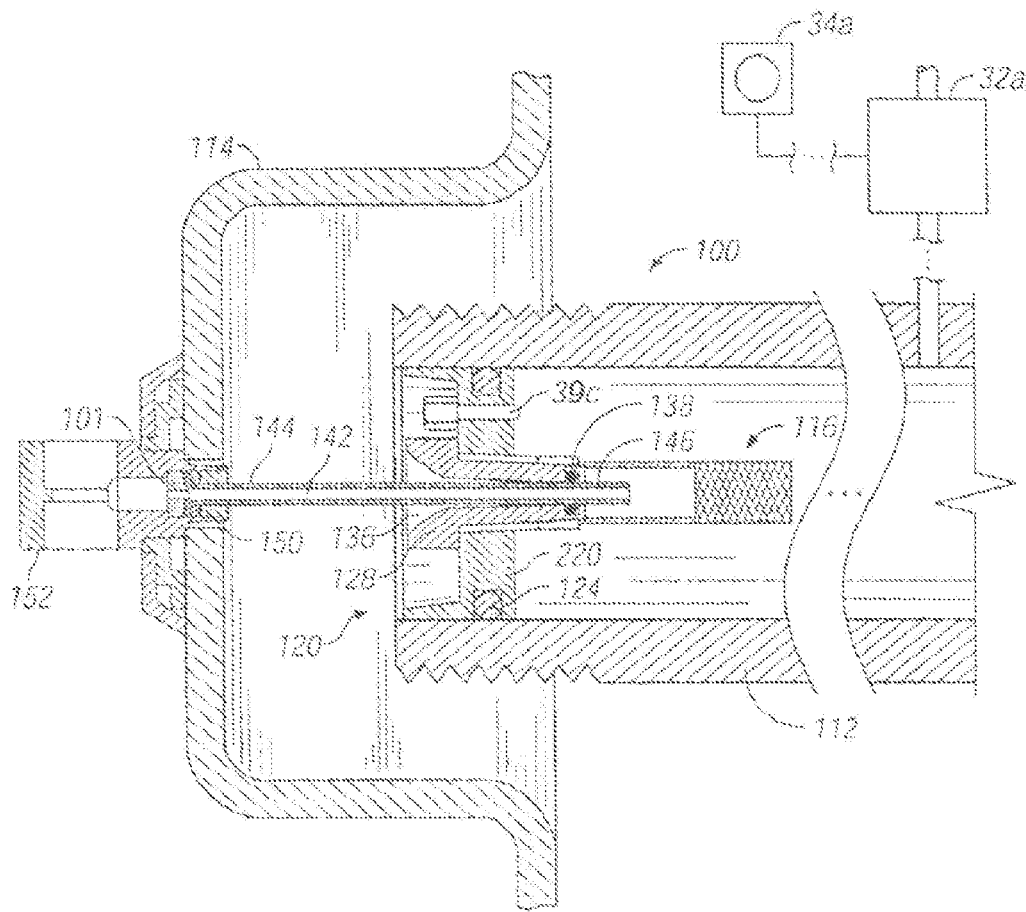
FIG. 15 is an elevational cross-sectional view of a portion of an automatic tire inflation system connected to an axle and another embodiment of a wheel-end assembly high-temperature warning system.
Figure 16:
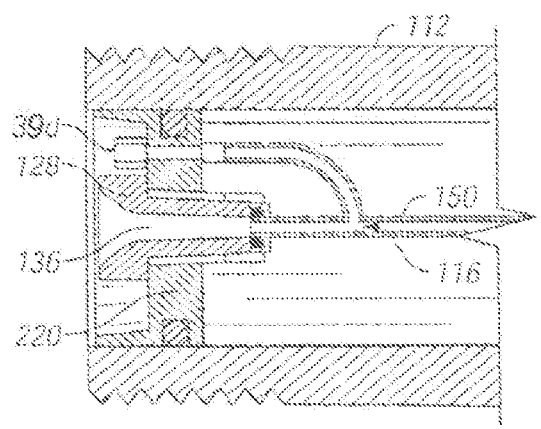
FIG. 16 is an elevational view, in cross section, illustrating a part of an automatic tire inflation system with another embodiment of a wheel-end assembly high-temperature warning system.
Figure 17:
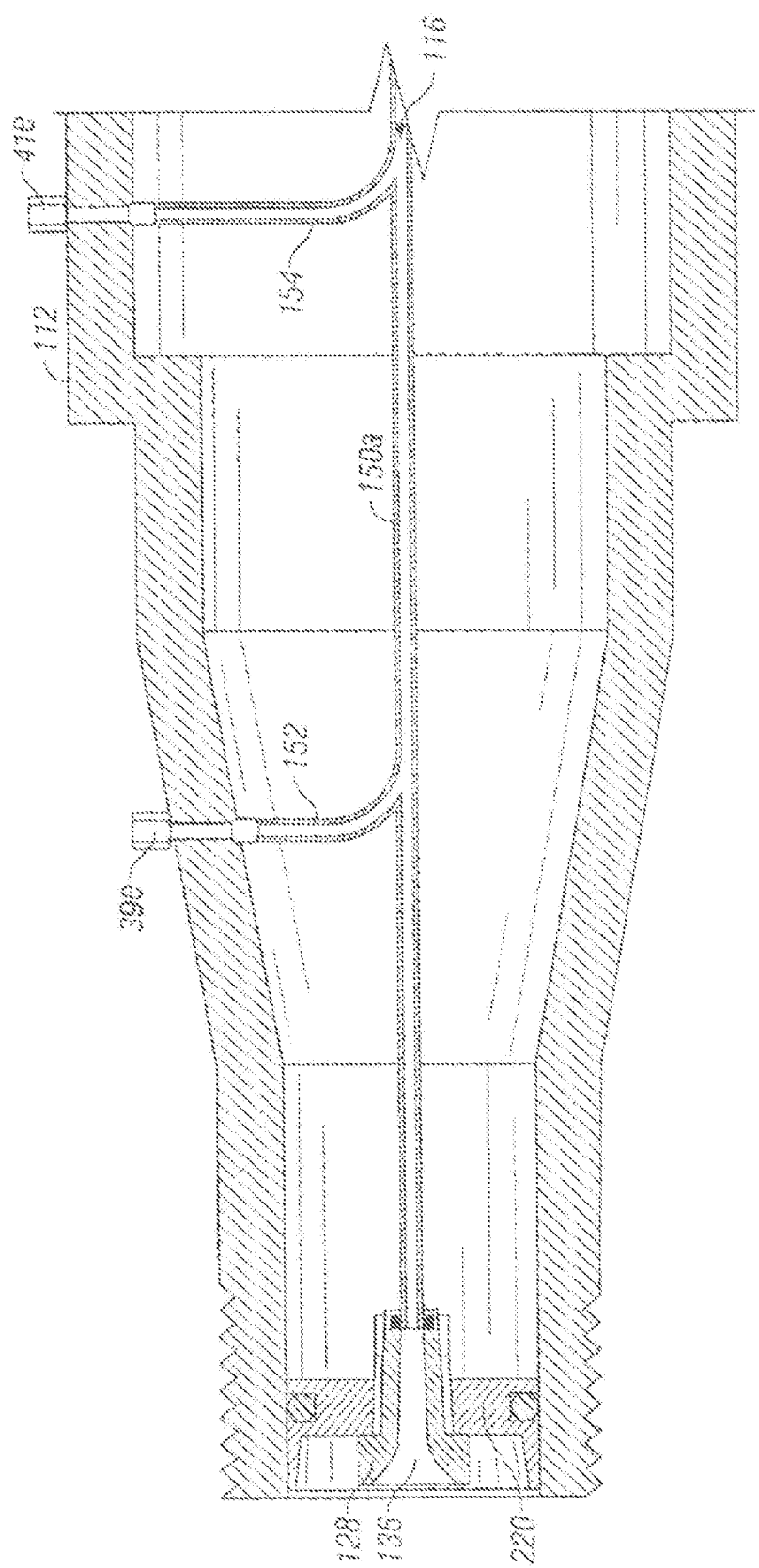
FIG. 17 is an elevational view in cross section of a part of an automatic tire inflation system showing another embodiment of a wheel-end assembly high-temperature warning system.
Figure 18:
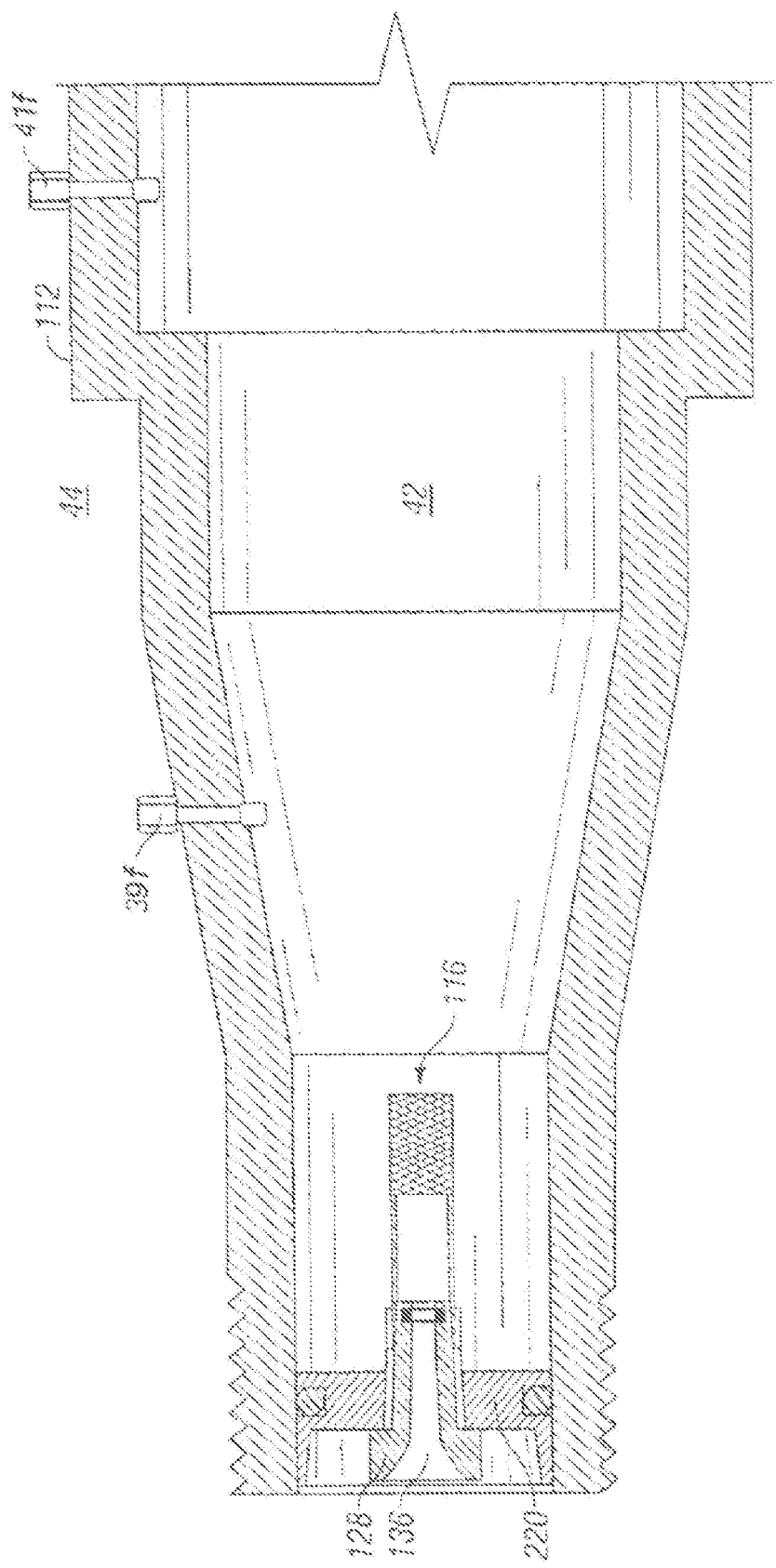
FIG. 18 is an elevational view, in cross section, showing a part of another automatic tire inflation system having another embodiment of a wheel-end assembly high-temperature warning system.

Referring now to FIG. 8, a further form of the present invention is shown including an automatic tire inflation system in which only the stationary part 128 of the rotary connection is shown. Again, in this embodiment, the air supply 116 is supplied to an air tubing or conduit 150a inside of the axle 112 and is connected to the passageway 136 in the part 128. Heat sensitive pressure barriers or fusible plugs 38e and 40e are provided radially extending out of the axle 112 and are connected to the air supply tubing 150a by air tubes 152 and 154.

Referring now to FIG. 9, again, another form of the present invention is shown which includes an automatic tire inflation system in which only the stationary part 128 of the rotary connection is shown. In this embodiment, the interior of the hollow axle 112 forms part of the air supply for supplying air by 116 to the passageway 136. Again, heat sensitive pressure barriers or plugs 38f and 40f are provided radially extending through the wall of the axle 112 or spindle.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

What is claimed is:

1. A wheel-end assembly comprising:
   a wheel hub mounted to an axle spindle on an inner bearing and an outer bearing, the outer bearing being disposed along said axle spindle between said inner bearing and the free end of said axle spindle, said axle spindle being capable of including pressurized air; and
   a high-temperature warning valve mounted at the free end of said axle spindle, said valve being capable of receiving heat from said inner bearing or said outer bearing and being capable of releasing said pressurized air in response to said heat.

2. The wheel-end assembly of claim 1, wherein said valve is capable of releasing said pressurized air upon said valve reaching a predetermined temperature.

3. The wheel-end assembly of claim 2, wherein said valve is configured to emit a noise when releasing said pressurized air, said noise capable of being audible to a driver of a vehicle using said wheel-end assembly.

4. The wheel-end assembly of claim 2, wherein said valve comprises a fusible material.

5. The wheel-end assembly of claim 1, wherein said valve is a fusible plug.

6. The wheel-end assembly of claim 5, wherein said fusible plug comprises a eutectic alloy.

7. The wheel-end assembly of claim 1, wherein said axle is sealed to contain said pressurized air.

8. The wheel-end assembly of claim 1, wherein said axle includes a conduit for communicating pressurized air to said valve.

9. A wheel-end assembly comprising:
   a wheel-end component mounted at the free end of a spindle of an axle, said axle being capable of including pressurized air; and
   a high temperature warning valve disposed at the free end of the spindle to receive heat from said wheel-end component, said valve capable of releasing said pressurized air upon said valve receiving heat from said wheel-end component exceeding a predetermined temperature.

10. The wheel-end assembly of claim 9, wherein said valve is configured to emit a noise of predetermined frequency when releasing said pressurized air.

11. A wheel-end assembly comprising:
a wheel-end component comprising a wheel bearing, the wheel-end component mounted at a free end of an axle spindle, said axle being capable of including pressurized air;
a heat sensor mounted at the free end of the axle spindle in a heat-exchange relationship with the wheel bearing; and
a high temperature warning valve connected to said heat sensor and to said pressurized air, said valve being capable of opening to release said pressurized air when said heat sensor reaches a pre-determined temperature due to heat received from said wheel bearing.

12. The wheel-end assembly of claim 11, wherein said heat sensor comprises a thermal electric switch.

13. The wheel-end assembly of claim 11, wherein said heat sensor comprises a thermocouple.

14. The wheel-end assembly of claim 11, wherein said heat sensor comprises a thermistor.

15. The wheel-end assembly of claim 11, wherein said valve is electrically-operated.

16. The wheel-end assembly of claim 11, wherein said connection between said valve and said heat sensor is wireless.

* * * * *